(12) United States Patent
Yi et al.

(10) Patent No.: US 12,323,731 B2
(45) Date of Patent: Jun. 3, 2025

(54) IMAGE DATA PROCESSING METHOD AND ASSOCIATED ELECTRONIC DEVICE

(71) Applicant: Realtek Semiconductor Corp., HsinChu (TW)

(72) Inventors: Wan-Cheng Yi, HsinChu (TW); Ji-De Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 133 days.

(21) Appl. No.: 18/379,187

(22) Filed: Oct. 12, 2023

(65) Prior Publication Data

US 2024/0205364 A1 Jun. 20, 2024

(30) Foreign Application Priority Data

Dec. 15, 2022 (TW) .................................. 111148198

(51) Int. Cl.
*G06F 3/038* (2013.01)
*H04N 7/01* (2006.01)

(52) U.S. Cl.
CPC ................................ *H04N 7/0125* (2013.01)

(58) Field of Classification Search
CPC ..................................................... H04N 7/0125
USPC ........................................................... 345/204
See application file for complete search history.

(56) References Cited

U.S. PATENT DOCUMENTS

| 2007/0014362 A1* | 1/2007 | Cruz | H04N 19/615 |
| | | | 375/E7.262 |
| 2012/0328192 A1* | 12/2012 | Fukuhara | H04N 19/647 |
| | | | 382/233 |
| 2015/0288963 A1* | 10/2015 | Sato | H04N 19/86 |
| | | | 375/240.14 |
| 2018/0034470 A1* | 2/2018 | Fan | H03M 3/462 |

FOREIGN PATENT DOCUMENTS

TW 201206153 A1 2/2012

* cited by examiner

*Primary Examiner* — Jonathan M Blancha
(74) *Attorney, Agent, or Firm* — Winston Hsu

(57) ABSTRACT

The present invention provides an electronic device including a receiving circuit, a buffer, an output circuit and a control circuit. The receiving circuit is configured to receive input image data. The buffer is configured to temporarily store the input image data. The output circuit is configured to read the input image data from the buffer to generate output image data. The control circuit is configured to the generate a control signal according to a bit depth of the input image data, to dynamically control a delay time for the output circuit to generate the output image data.

10 Claims, 5 Drawing Sheets

IMAGE DATA PROCESSING METHOD AND ASSOCIATED ELECTRONIC DEVICE

BACKGROUND OF THE INVENTION

1. Field of the Invention

The present invention relates to an image communication interface.

2. Description of the Prior Art

With the popularization of high-definition images, the amount of image data is increasing. Therefore, a transmitter will compress the data before data transmission, or dynamically change pixel depth (also known as pixel depth or the number of bits per pixel, BPP) in a timing format defined by a Video Electronics Standards Association (VESA), to maintain high-quality images while reducing the amount of data.

For a receiver configured to receive the image data from the external transmitter, there is usually a buffer designed to temporarily store the image data, and the image data stored in the buffer will be continuously performed format conversion operation and sent to a back-end display for display. The size of the buffer needs to take into account the variation of the pixel depth when designing, that is, the buffer needs to be large enough to temporarily store the image data with the maximum pixel depth (e.g., BPP=16). However, if there is a small amount of data transmitted by the transmitter (e.g., BPP=8), the buffer with large size will cause the delay time for outputting image data to the back-end display to be too long, causing the display sometimes unable to display image data in a real-time manner.

SUMMARY OF THE INVENTION

Therefore, one of the objectives of the present invention is to provide a method for dynamically adjusting a delay time of an output image data of the buffer according to a bit depth of the image data, so as to solve the problems in the prior art.

According to one embodiment of the present invention, an electronic device comprising a receiving circuit, a buffer, an output circuit and a control circuit is disclosed. The receiving circuit is configured to receive input image data. The buffer is configured to temporarily store the input image data. The output circuit is configured to read the input image data from the buffer to generate output image data. The control circuit is configured to the generate a control signal according to a bit depth of the input image data, to dynamically control a delay time for the output circuit to generate the output image data.

According to one embodiment of the present invention, an image processing method comprises the steps of: receiving input image data; temporarily storing the input image data in a buffer; using an output circuit to read the input image data from the buffer to generate output image data; and generating a control signal according to a bit depth of the input image data, to dynamically control a delay time for the output circuit to generate the output image data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
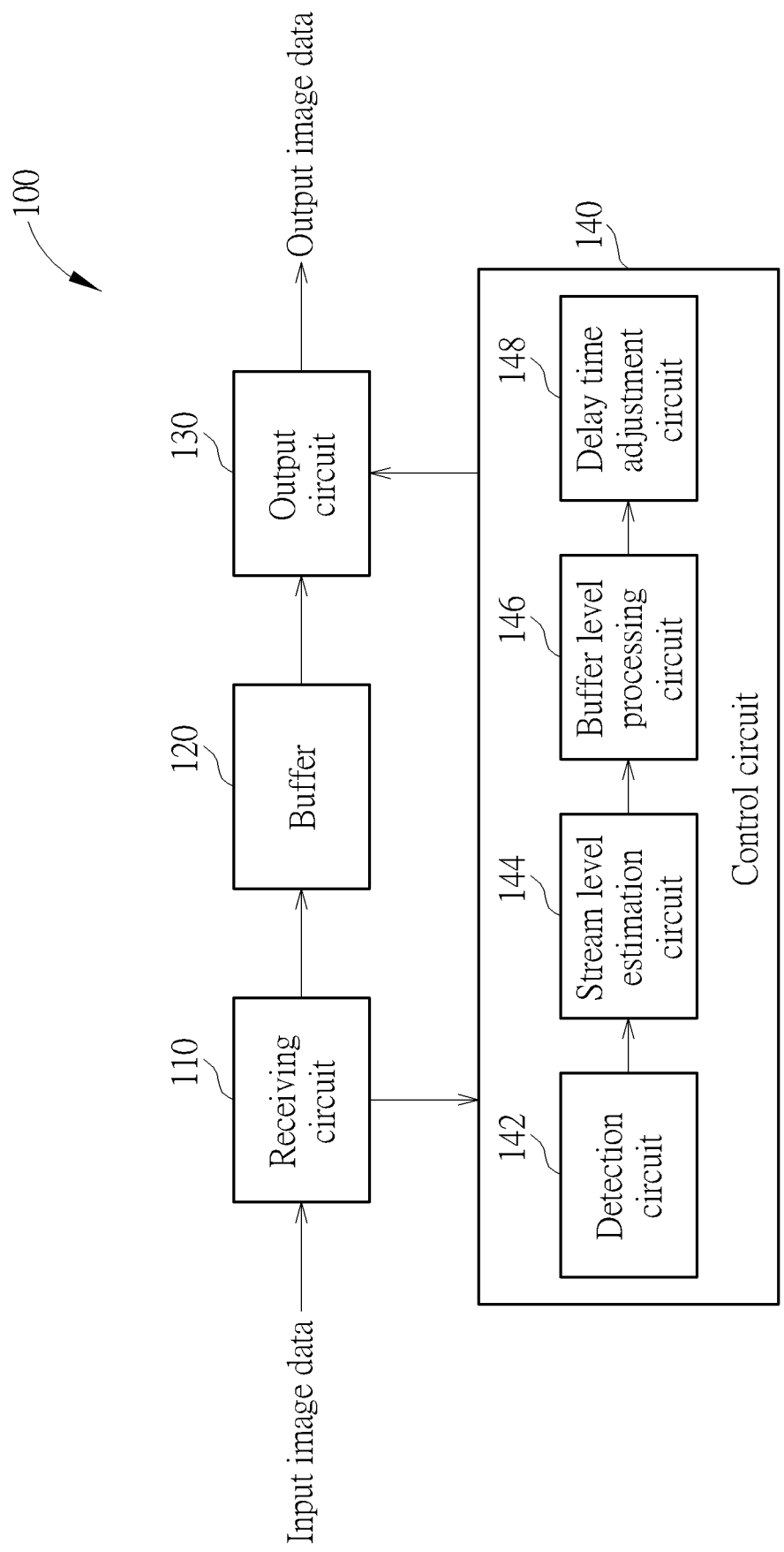
FIG. 1 is a diagram illustrating an electronic device according to one embodiment of the present invention.

FIG. 1 is a diagram illustrating an electronic device 100 according to one embodiment of the present invention. As shown in FIG. 1, the electronic device 100 comprises a receiving circuit 110, a buffer 120, an output circuit 130 and a control circuit 140, wherein the control circuit 140 comprises a detection circuit 142, a stream level estimation circuit 144, a buffer level processing circuit 146 and a delay time adjustment circuit 148. In this embodiment, the buffer 120 is a first-in-first-out (FIFO) buffer, and the electronic device 100 is used to receive and temporarily store input image data, and process the input image data (e.g., performing a format conversion operation) to generate output image data to the back-end display for display. In this embodiment, the electronic device 100 may be a chip located in a display, or an external electronic device for providing the output image data to the display, and the electronic device 100 supports a DisplayPort (DP) specification.

Figure 2:
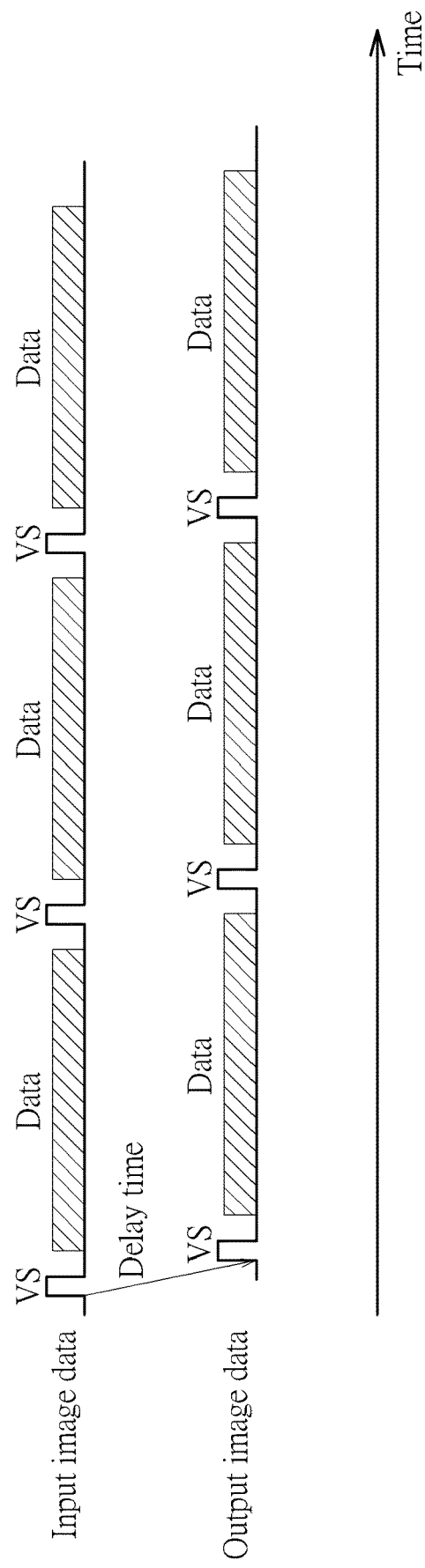
FIG. 2 is a timing diagram of input image data and output image data.

In order to allow the electronic device 100 to continuously generate the output image data to the back-end display for display, the amount of data temporarily stored in the buffer 120 needs to be higher than a basic level, so that the output circuit 130 always has enough image data for output, and prevents a underflow issue of the buffer 120. In addition, the speed at which the output circuit 130 generates output image data also needs to be controlled to prevent the image data stored in the buffer 120 from reaching a full level, resulting in an overflow issue. In this embodiment, since the bit depth (i.e., BPP) of the input image data will change with the image content, the amount of data temporarily stored in the buffer 120 will therefore change, and may be lower than the basic level or reach the full level, resulting in underflow issue or overflow issue. Therefore, in order to avoid this problem, the present embodiment provides the control circuit 140 to dynamically adjust the delay time for the output circuit 130 to generate the output image data according to the bit depth of the input image data, so as to control the amount of data in the buffer 120 within a certain level range. Referring to FIG. 2 showing a timing diagram of input image data and output image data, the delay time of each frame of the input image data and the output image data is a time difference of the vertical synchronization signal (i.e., the symbol VS shown in FIG. 2), and the delay time of each frame can be determined by the control circuit 140, that is, the delay time of the first frame can be different from the delay time of the second frame shown in FIG. 2.

Figure 3:
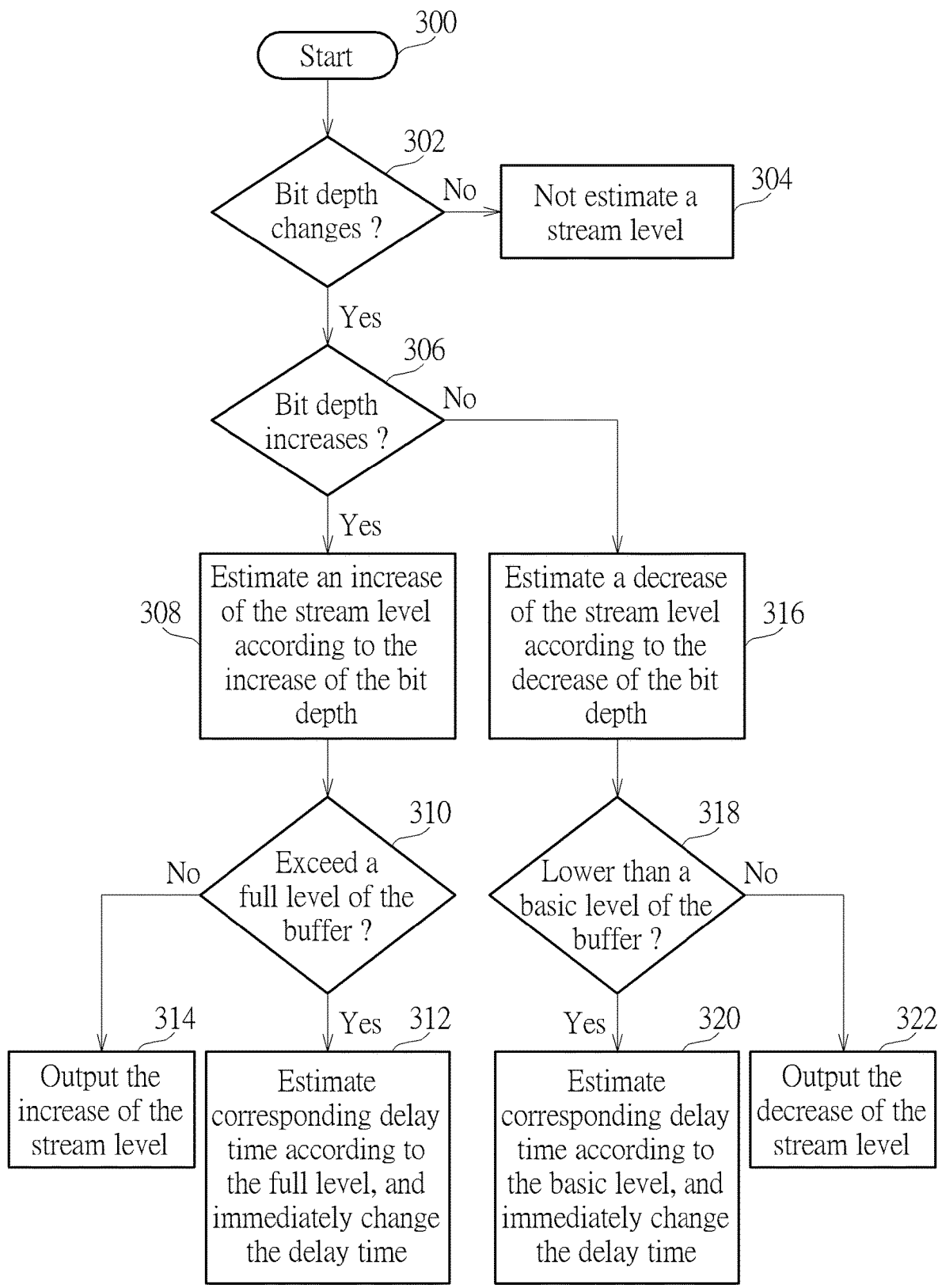
FIG. 3 is a flowchart of an operation of a stream level estimation circuit according to one embodiment of the present invention.

In the operation of the electronic device 100, first, the receiving circuit 110 receives the input image data from the external device, and sequentially stores the input image data into the buffer 120. In addition, the receiving circuit 110 will analyze/parse the input image data to determine a current bit depth of the output image data. Then, the detection circuit 142 determines whether the bit depth of the input image data has changed, for the stream level estimation circuit 144 and the buffer level processing circuit 146 perform related operations. Specifically, refer to FIG. 3 showing a flowchart of an operation of a stream level estimation circuit 144 according to one embodiment of the present invention. In Step 300, the flow starts. In Step 302, the stream level estimation circuit 144 determines whether the bit depth of the input image data has changed according to a detection result generated by the detection circuit 142, if yes, the flow enters Step 306 to start estimating the variation of the stream level; and if not, the flow enters Step 304 and stop estimating the variation of the stream level. In step 306, the stream level estimation circuit 144 determines whether the bit depth of the input image data increases, if yes, the flow enters Step 308; and if not, the flow enters Step 316.

In Step 308, the stream level estimation circuit 144 estimates the increase of the stream level according to the increase of the bit depth of the input image data, that is, the stream level estimation circuit 144 estimates the increase of the amount of data of the input image data due to the increase of the bit depth, and this increase in the stream level results in an increase in the level of the buffer 120 (i.e., amount of data temporarily stored in the buffer 120 will increase). In other words, assuming that the bit depth of the input image data is increased from "8" to "16", the amount of data of the input image data will increase significantly, and at this time, if the output circuit 130 still uses the original delay time to generate the output image data, the level of the buffer 120 will increase.

In one embodiment, assuming that the buffer 120 uses 64 bits as a storage unit, then under the same bit depth (i.e., BPP), the variation of the stream level and the variation of the delay time have the following relationship:

$$\text{variation of stream level} = \text{variation of delay time} * \text{BPP}/64 \qquad (1).$$

Therefore, the variation of the stream level after the bit depth is changed (e.g., bit depth=16) can be calculated by using the delay time before the bit depth of the input image data is changed (e.g., bit depth=8).

In Step 310, the stream level estimation circuit 144 determines whether the buffer 120 will exceed the full level due to the increase of the bit depth of the input image data according to the calculated variation of the stream level (i.e., the increase of the stream level) and the current level of the buffer 120, if yes, the flow enters Step 312; if not, the flow enters Step 314.

In Step 312, the stream level estimation circuit 144 estimates the corresponding delay time or delay time variation according to the full level of the buffer 120, and immediately controls the output circuit 130 through the delay time adjustment circuit 148 to change the delay time for generating the output image data. For example, a difference between the current stream level and the full level of the buffer 120 can be brought into "variation of stream level" in the above formula (1) to estimate the corresponding variation/increase of delay time, and immediately use the delay time adjustment circuit 148 to control the output circuit 130 to reduce the delay time for generating the output image data, so as to avoid overflow issue.

In step 314, the stream level estimation circuit 144 transmits the calculated increase of the stream level to the buffer level processing circuit 146.

In Step 316, the stream level estimation circuit 144 estimates the decrease of the stream level according to the decrease of the bit depth of the input image data, that is, the stream level estimation circuit 144 estimates the decrease of the amount of data of the input image data due to the decrease of the bit depth, and this decrease in the stream level results in a decrease in the level of the buffer 120 (i.e., amount of data temporarily stored in the buffer 120 will decrease). In other words, assuming that the bit depth of the input image data is decreased from "16" to "8", the amount of data of the input image data will decrease significantly, and at this time, if the output circuit 130 still uses the original delay time to generate the output image data, the level of the buffer 120 will decrease. In one embodiment, the decrease of the stream level stream can be calculated by the above formula (1).

In Step 318, the stream level estimation circuit 144 determines whether the level of buffer 120 will be lower than the basic level due to the decrease of the bit depth of the input image data according to the calculated decrease of the stream level and the current level of the buffer 120, if yes, the flow enters Step 320; if not, the flow enters Step 322.

In Step 320, the stream level estimation circuit 144 estimates the corresponding delay time or delay time variation according to the basic level of the buffer 120, and immediately controls the output circuit 130 through the delay time adjustment circuit 148 to change the delay time for generating the output image data. For example, a difference between the current stream level and the basic level of the buffer 120 can be brought into "variation of stream level" in the above formula (1) to estimate the corresponding variation/decrease of delay time, and immediately use the delay time adjustment circuit 148 to control the output circuit 130 to increase the delay time for generating the output image data, so as to avoid underflow issue.

In step 322, the stream level estimation circuit 144 transmits the calculated decrease of the stream level to the buffer level processing circuit 146.

Figure 4:
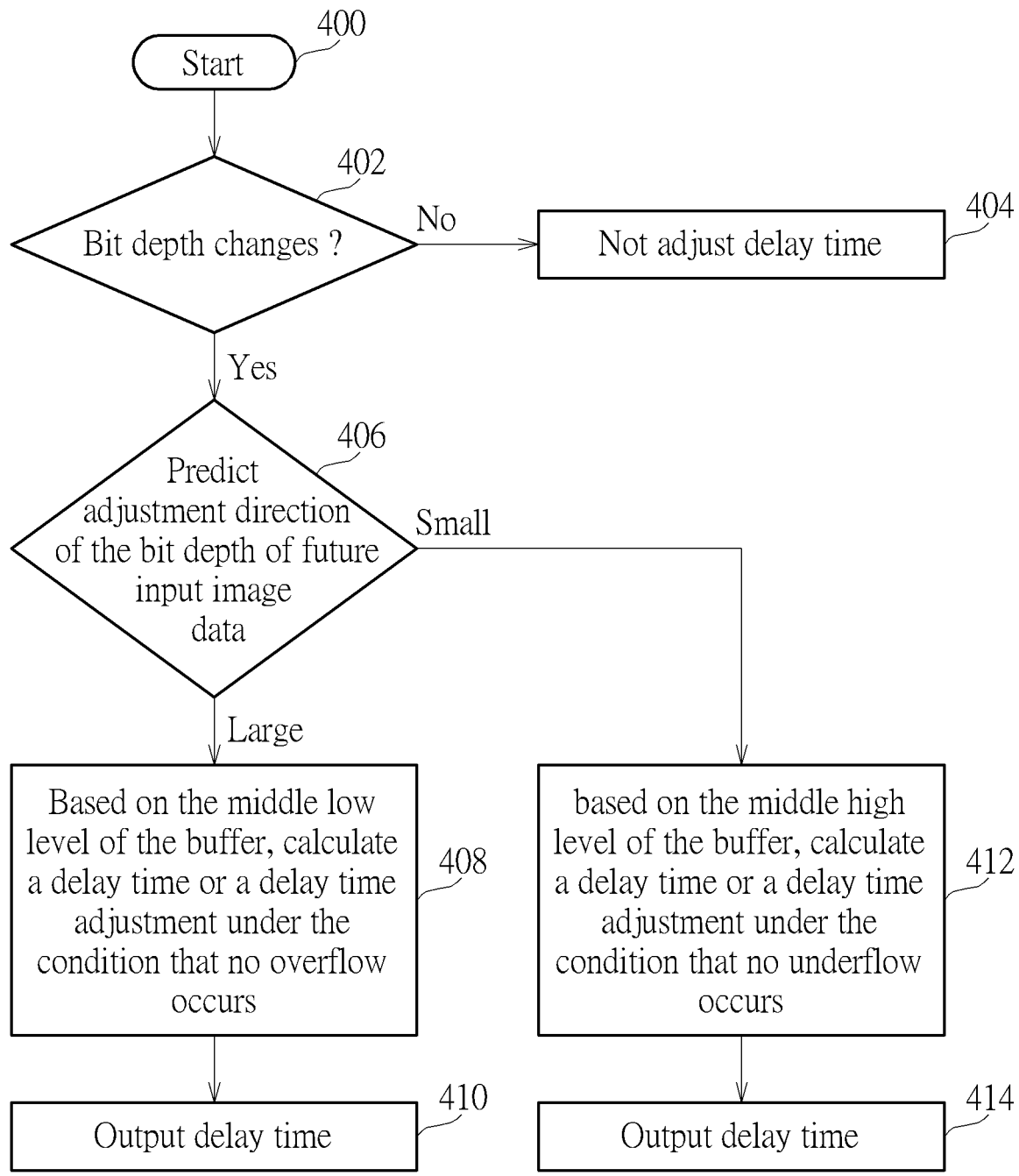
FIG. 4 is a flowchart of an operation of a buffer level processing circuit according to one embodiment of the present invention.

FIG. 4 is a flowchart of an operation of the buffer level processing circuit 146 according to one embodiment of the present invention. In Step 400, the flow starts. In Step 402, the buffer level processing circuit 146 determines whether the bit depth of the input image data has changed according to the detection result generated by the detection circuit 142, if yes, the flow enters Step 406 to determine the delay time adjustment amount; and if not, the flow enters Step 404, and the buffer level processing circuit 146 will not determine the delay time adjustment amount, that is, the delay time adjustment circuit 148 controls the output circuit 130 to use the current delay time to generate output image data.

In step 406, the buffer level processing circuit 146 estimates/predicts the adjustment direction of the bit depth of the future input image data according to the bandwidth of the current output image data, if it is estimated that the bit depth will increase, the flow enters Step 408; and if it is estimated that the bit depth will decrease, the flow enters Step 412.

In step 408, based on the middle low level of the buffer 120 (for example, a level between the basic level and an intermediate value of the basic level and the full level) or the basic level, and based on the current level of the buffer 120 and the increase/decrease of the stream level calculated in FIG. 3, the buffer level processing circuit 146 calculates an optimal delay time or a delay time adjustment required to achieve the optimal delay time under the condition that no overflow occurs. In Step 410, the buffer level processing circuit 146 transmits the calculated delay time adjustment amount to the delay time adjustment circuit 148.

In step 412, based on the middle high level of the buffer 120 (for example, a level between the full level and an intermediate value of the basic level and the full level) or the full level, and based on the current level of the buffer 120 and the increase/decrease of the stream level calculated in FIG. 3, the buffer level processing circuit 146 calculates an optimal delay time or a delay time adjustment required to achieve the optimal delay time under the condition that no underflow occurs. In Step 414, the buffer level processing circuit 146 transmits the calculated delay time adjustment amount to the delay time adjustment circuit 148.

Figure 5:
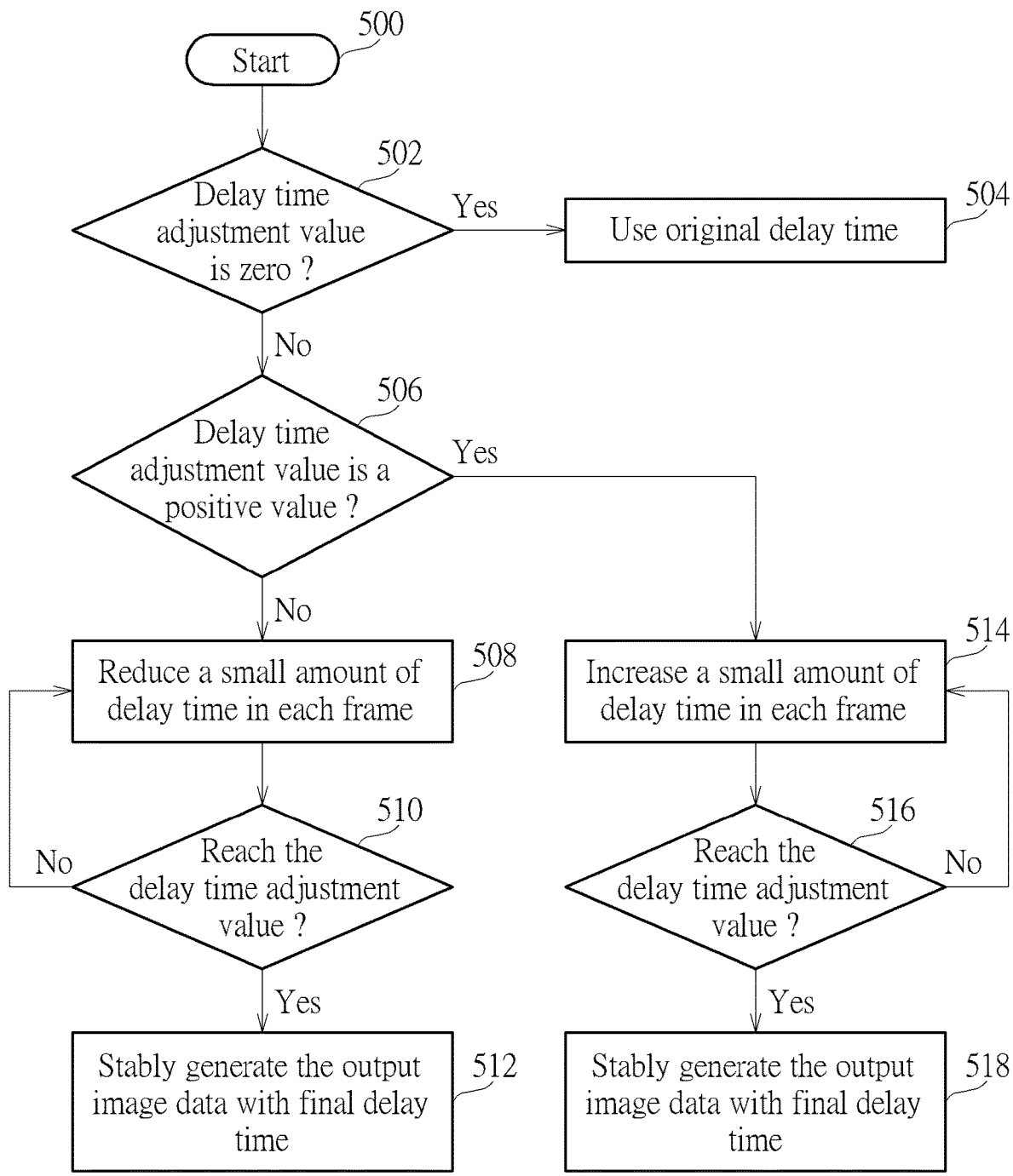
FIG. 5 is a flowchart of an operation of a delay time adjustment circuit according to one embodiment of the present invention.

FIG. 5 is a flowchart of an operation of the delay time adjustment circuit 148 according to one embodiment of the present invention. In Step 500, the flow starts. In Step 502, the delay time adjustment circuit 148 determines whether the delay time adjustment value calculated by the buffer level processing circuit 146 is zero, if yes, the flow enters Step 504, and the output circuit 130 directly uses the original delay time to transmit the output image data to back-end display; and if not, the flow enters Step 506. In Step 506, the delay time adjustment circuit 148 determines whether the delay time adjustment value is a positive value, if yes, the flow enters Step 514; and if not, the flow enters Step 508.

In Step 508, the delay time adjustment circuit 148 generates a control signal to control the output circuit 130 to reduce a small amount of delay time in each frame, wherein the purpose of "reducing a small amount of delay time" is to avoid sudden large changes in the amount of output image data, which may cause unpredictable situations in the reception of image data by the back-end display. In Step 510, the delay time adjustment circuit 148 determines whether a summation of the delay times reduced in the Step 508 reaches the delay time adjustment amount calculated by the buffer level processing circuit 146, if yes, the flow enters Step 512; and if not, the flow goes back to Step 508 to continue reducing the delay time by a small amount in the next frame. In Step 512, since the delay time has been properly adjusted, the delay time adjustment circuit 148 generates a control signal to control the output circuit 130 to stably generate the output image data with the final delay time.

In Step 514, the delay time adjustment circuit 148 generates a control signal to control the output circuit 130 to increase a small amount of delay time in each frame, wherein the purpose of "increasing a small amount of delay time" is to avoid sudden large changes in the amount of output image data, which may cause unpredictable situations in the reception of image data by the back-end display. In Step 516, the delay time adjustment circuit 148 determines whether a summation of the delay times increased in the Step 508 reaches the delay time adjustment amount calculated by the buffer level processing circuit 146, if yes, the flow enters Step 518; and if not, the flow goes back to Step 514 to continue increasing the delay time by a small amount in the next frame. In Step 518, since the delay time has been properly adjusted, the delay time adjustment circuit 148 generates a control signal to control the output circuit 130 to stably generate the output image data with the final delay time.

The following illustrates the operation of the control circuit 140. In the following description, it is assumed that the buffer size that can be borrowed by the back-end of the electronic device 100 is "170", the full level of the buffer 120 is "640", the basic level is "320", the standard delay time is "500" and a maximum stream level is "580" when the bit depth of the input image data is "16", the standard delay time is "750" and the maximum stream level is "400" when the bit depth of the input image data is "10", the standard delay time is "1000" and the maximum stream level is "350" when the bit depth of the input image data is "8", and the maximum stream level is "350" (these values can be estimated/calculated based on a display stream compression function of the DP specification). It should be noted that the level of the buffer 120 and the numerical value of the standard delay time are only used as examples, rather than limitations of the present invention; and the level of the buffer 120 and the standard delay time can have any suitable units, for example, the buffer 120 uses 64 bits as a storage unit, and the unit of the standard delay time can be a period of the pixel clock. In the operation of the buffer level processing circuit 146, assuming that the bit depth of the input image data is "16", the dynamic change range of the bit depth is "8"-"16", so the operation of the buffer level processing circuit 146 is as follows.

(1) Since the bit depth of subsequent input image data will only decrease but not increase, the full level of the buffer 120 is used to obtain the range of the delay time. Use the full level of the buffer 120 (i.e. "640") and the above formula (1) to calculate the delay time: 500+(640−580)*64/16=740, it can be calculated that the delay time corresponding to the optimal level of the buffer 120 may between 500-740.

(2) Consider the maximum variation range, that is, the bit depth is changed to "8", the level of the buffer 120 under the above delay time range can be analyzed as follows:

(2.1) The standard delay time "1000" results in a maximum stream level "350" when the bit depth is "8".

(2.2) The acceptable minimum delay time when using bit depth "16" is "500", and use the formula (1) to estimate the maximum stream level: 350+(500−1000)*8/64=287.5, which is lower than the basic level of the buffer 120 (i.e. "320"), thus causing underflow issue.

(2.3) The acceptable maximum delay time when using bit depth "16" is "740", and use the formula (1) to estimate the maximum stream level: 350+(740−1000)*8/64=317.5, which is lower than the basic level of the buffer 120 (i.e. "320"), thus causing underflow issue.

(2.4) Because the above items (2.2) and (2.3) cannot meet the level requirements of the buffer 120 when the bit depth is "8", the estimated delay time required to satisfy the basic level "320" of the buffer 120 when bit depth is "8" is calculated as follows: 1000+(320−350)×64/8=760.

(2.5) There is a difference "20" between the required minimum delay time "760" for bit depth "8"" and the acceptable maximum delay time "740" for bit depth "16", wherein the delay time adjustment "20" is relative to the amount of data "80 pixels" in the buffer 120, which is lower than the buffer size "170" that the back-end can borrow. The amount of data of the above-mentioned 80 pixels can be estimated through the frequency of the pixel clock, the clock frequency of the display compression stream (DSC) and the adjustment amount of the delay time. In this embodiment, it is assumed that the pixel clock has the frequency equal to 1019.9 MHZ, and the clock frequency for display compression stream is 254.9 MHZ, so how many pixels of data in the buffer 120 corresponding to the delay time adjustment "20" can be calculated as follows: 20*1019.9/254.9~80.

(2.6) The optimal delay time can be set to "740" when the bit depth is "16". Although using the delay time "740" will cause the underflow issue of the buffer 120 when the bit depth changes from "16" to "8", the delay time can be adjusted to "760" at the moment of the bit depth dynamic changes, so that the buffer 120 can also operate normally when the bit depth is "8". Therefore, the delay time "740" can be regarded as the optimal delay time when the bit depth is "16", so as to be able to cover the widest range of bit depth dynamic changes.

(3) Verify whether the optimal delay time found in item (2.6) can be applied to other bit depth, to ensure that the optimal delay time is correct, taking the bit depth as "10" as an example:

(3.1) When the bit depth is "10", the standard delay time is "750" results in the maximum stream level "400". Using the optimal delay time "740" found when the bit depth is "16", the maximum stream level can be estimated as follows: 400+(740−750)*10/64=398.4, so the buffer 120 works normally.

As mentioned above, when the bit depth is "16", the optimal delay time is "740", therefore, the buffer level processing circuit 146 can calculate the corresponding delay time adjustment (for example, 740−500=240), for the delay time adjustment circuit 148 to control the output circuit 130 to adjust the delay time for generating the output image data. Then, if the bit depth of the input image data is changed from "16" to "8", the delay time adjustment circuit 148 will immediately control the output circuit 130 to adjust the delay time to "760", and then perform the above steps (2.1)-(2.6) to determine the optimal delay time when the bit depth is "8". In addition, if the bit depth of the input image data is changed from "16" to "10", the delay time adjustment circuit does not need to control the output circuit 130 to adjust the delay time.

Briefly summarized, in the electronic device of the present invention, when the bit depth of the input image data changes, the control circuit 140 can determine the appropriate delay time or delay time adjustment amount according to the bit depth and the subsequent possible bit depth variation, for the output circuit 130 to generate the output image data. In this way, the amount of data temporarily stored in the buffer 120 can be continuously maintained between the basic level and the full level, so as to avoid overflow or underflow issue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a receiving circuit, configured to receive input image data;
   a buffer, configured to temporarily store the input image data;
   an output circuit, configured to read the input image data from the buffer to generate output image data; and
   a control circuit, configured to the generate a control signal according to a bit depth of the input image data, to dynamically control a delay time for the output circuit to generate the output image data.

2. The electronic device of claim 1, wherein the control circuit comprises:
   a stream level estimation circuit, configured to estimate an increase of a stream level of the input image data according to an increase of the bit depth when the bit depth of the input image data increases, and to estimate a decrease of the stream level of the input image data according to a decrease of the bit depth when the bit depth of the input image data decreases; and
   a delay time adjustment circuit, configured to control the delay time of the output circuit; and
   wherein if the increase of the stream level will cause amount of data in the buffer to exceed a full level, the delay time adjustment circuit immediately controls the output circuit to reduce the delay time; and if the decrease of the stream level will cause the amount of data in the buffer to be lower than a basic level, the delay time adjustment circuit immediately controls the output circuit to increase the delay time.

3. The electronic device of claim 2, wherein if the increase of the stream level will cause the amount of data in the buffer to exceed the full level, the stream level estimation circuit estimates a first delay time according to the full level of the buffer, and the delay time adjustment circuit control the output circuit to reduce the delay time according to the first delay time; and if the decrease of the stream level will cause the amount of data in the buffer to be lower than the basic level, the stream level estimation circuit estimates a second delay time according to the basic level of the buffer, and the delay time adjustment circuit control the output circuit to increase the delay time according to the second delay time.

4. The electronic device of claim 2, wherein the control circuit further comprises:
   a buffer level processing circuit, coupled to the stream level estimation circuit, configured to estimate/predict an adjustment direction of the bit depth of future input image data, so as to calculate an optimal delay time.

5. The electronic device of claim 4, wherein if it is estimated/predicted that the bit depth of the future input image data increases, the buffer level processing circuit calculates the optimal delay time according to the basic level so that data within the buffer will not exceed the full level when the bit depth of the input data increases; if it image and is estimated/predicted that the bit depth of the future input image data decreases, the buffer level processing circuit calculates the optimal delay time according to the full level so that the data within the buffer will not be lower than the basic level when the bit depth of the input image data decreases.

6. An image data processing method, comprising:
   receiving input image data;
   temporarily storing the input image data in a buffer;
   using an output circuit to read the input image data from the buffer to generate output image data; and
   generating a control signal according to a bit depth of the input image data, to dynamically control a delay time for the output circuit to generate the output image data.

7. The image data processing method of claim 6, wherein the step of generating the control signal according to the bit depth of the input image data, to dynamically control the delay time for the output circuit to generate the output image data comprises:
   estimating an increase of a stream level of the input image data according to an increase of the bit depth when the bit depth of the input image data increases; and estimating a decrease of the stream level of the input image data according to a decrease of the bit depth when the bit depth of the input image data decreases; and
   if the increase of the stream level will cause amount of data in the buffer to exceed a full level, immediately controlling the output circuit to reduce the delay time; and if the decrease of the stream level will cause the amount of data in the buffer to be lower than a basic level, immediately controlling the output circuit to increase the delay time.

8. The image data processing method of claim 7, wherein the step of generating the control signal according to the bit depth of the input image data, to dynamically control the delay time for the output circuit to generate the output image data comprises:

if the increase of the stream level will cause the amount of data in the buffer to exceed the full level, estimating a first delay time according to the full level of the buffer, and controlling the output circuit to reduce the delay time according to the first delay time; and if the decrease of the stream level will cause the amount of data in the buffer to be lower than the basic level, estimating a second delay time according to the basic level of the buffer, and controlling the output circuit to increase the delay time according to the second delay time.

9. The image data processing method of claim 7, wherein the step of generating the control signal according to the bit depth of the input image data, to dynamically control the delay time for the output circuit to generate the output image data comprises:

estimating/predicting an adjustment direction of the bit depth of future input image data, so as to calculate an optimal delay time.

10. The image data processing method of claim 9, wherein the step of estimating/predicting the adjustment direction of the bit depth of the future input image data, so as to calculate the optimal delay time comprises:

if it is estimated/predicted that the bit depth of the future input image data increases, calculating the optimal delay time according to the basic level so that data within the buffer will not exceed the full level when the bit depth of the input image data increases; and if it is estimated/predicted that the bit depth of the future input image data decreases, calculating the optimal delay time according to the full level so that the data within the buffer will not be lower than the basic level when the bit depth of the input image data decreases.

* * * * *